(12) United States Patent
Angelskaar

(10) Patent No.: US 7,947,334 B2
(45) Date of Patent: *May 24, 2011

(54) CEMENT ACCELERATOR AND METHOD

(75) Inventor: Terje Angelskaar, Zurich (CH)

(73) Assignee: Construction Research & Technology GmbH, Trostberg (DE)

( * ) Notice: Subject to any disclaimer, the term of this patent is extended or adjusted under 35 U.S.C. 154(b) by 977 days.

This patent is subject to a terminal disclaimer.

(21) Appl. No.: 10/495,825

(22) PCT Filed: Nov. 7, 2002

(86) PCT No.: PCT/EP02/12483
§ 371 (c)(1), (2), (4) Date: Jan. 18, 2005

(87) PCT Pub. No.: WO03/045872
PCT Pub. Date: Jun. 5, 2003

(65) Prior Publication Data
US 2006/0210716 A1   Sep. 21, 2006

(30) Foreign Application Priority Data

Nov. 28, 2001 (GB) .................................. 0128438.9

(51) Int. Cl.
*B05D 7/00* (2006.01)
*B05D 1/02* (2006.01)
*C04B 24/04* (2006.01)
*C04B 40/02* (2006.01)

(52) U.S. Cl. ..................... 427/421.1; 106/724; 106/802; 427/427

(58) Field of Classification Search .................... 427/426
See application file for complete search history.

(56) References Cited

U.S. PATENT DOCUMENTS

| | | | |
|---|---|---|---|
| 4,507,154 A | 3/1985 | Burge et al. | |
| 4,559,243 A | 12/1985 | Passler et al. | |
| 5,605,571 A | 2/1997 | Buerge et al. | |
| 5,911,819 A | 6/1999 | Drs et al. | |
| 5,935,318 A | 8/1999 | Angelskaar et al. | |
| 5,997,630 A | 12/1999 | Angelskar et al. | |
| 6,200,381 B1 * | 3/2001 | Rechichi ....................... | 106/801 |
| 6,302,954 B1 * | 10/2001 | Lunkenheimer et al. ...... | 106/727 |
| 6,537,367 B2 | 3/2003 | Sommer et al. | |
| 6,540,826 B2 | 4/2003 | Sommer et al. | |
| 6,692,564 B2 * | 2/2004 | Hofmann ....................... | 106/696 |
| 6,723,163 B1 | 4/2004 | Hofmann | |
| 2002/0035952 A1 | 3/2002 | Sommer et al. | |
| 2002/0144628 A1 * | 10/2002 | Honma et al. ............ | 106/123.13 |
| 2003/0082116 A1 * | 5/2003 | Badejo et al. .................... | 424/58 |

FOREIGN PATENT DOCUMENTS

| | | |
|---|---|---|
| EP | 0 076 888 A2 | 4/1983 |
| EP | 0 465 991 A1 | 1/1992 |
| EP | 0 508 158 A2 | 10/1992 |
| EP | 0 508 158 A3 | 10/1992 |
| EP | 0 657 398 A1 | 6/1995 |
| EP | 0 798 300 | 10/1997 |
| EP | 0 812 812 A1 | 12/1997 |
| GB | 650745 | 2/1951 |
| JP | 2000-185952 | 4/2000 |
| JP | 2001-130935 | 5/2001 |
| WO | WO 96/05150 | 2/1996 |
| WO | WO 00/78688 A1 | 12/2000 |
| WO | WO 0078688 A1 * | 12/2000 |
| WO | WO 01/42165 A2 | 6/2001 |
| WO | WO 01/42165 A3 | 6/2001 |
| WO | WO 0142165 A2 * | 6/2001 |
| WO | WO 03/029163 A2 | 4/2003 |

OTHER PUBLICATIONS

English language abstract of JP 10 330139, Publication Date Dec. 12, 1998; Applicant: Chichibu Onoda Cement Corp.
English language abstract of JP 11 021158A; Publication Date Jan. 1, 1999; Applicant: Chichibu Onoda Cement Corp.
English language abstract of JP 52 076328; Publication Date Jun. 27, 1977; Applicant: Mushashino Kagaku.
English language abstract of JP 2001-261393, Publication Date Sep. 26, 2001; Applicant: Denki Kagaku Kogyo KK.
Database WP 1. Derwent Publication Ltd., London GB: AN 1985-059647; XP002306994 and JP 60 016845 A (Kowa Chem Ind. Ltd) Abstract, Publication Date Jan. 28, 1985.

* cited by examiner

Primary Examiner — Michael Kornakov
Assistant Examiner — Alexander Weddle
(74) Attorney, Agent, or Firm — Curatolo Sidoti Co., LPA; Joseph G. Curatolo; Salvatore A. Sidoti

(57) ABSTRACT

An alkali-free accelerator for sprayed cementitious composition, such as concrete, is prepared by dissolving aluminium sulphate in water and amorphous aluminium hydroxide in water optionally containing amine, and adding at least one stabiliser which is glycolic acid, and optionally at least one defoaming agent.

10 Claims, No Drawings

CEMENT ACCELERATOR AND METHOD

CROSS REFERENCE TO RELATED APPLICATIONS

This application is a national stage application of International Application No. PCT/EP02/12483, filed Nov. 7, 2002, which claims the benefit of Application No. GB 0128438.9, filed Nov. 28, 2001, from which application priority is claimed.

This invention relates to cementitious compositions and to accelerators for use therein, particularly for sprayed concrete.

The application of a cementitious material such as concrete to a substrate by spraying from a nozzle is a well-established technology, and it is widely used in such applications as the lining of tunnels. It is important that the sprayed concrete set very rapidly on the substrate, and this is achieved by the addition to the concrete at the nozzle of an accelerator. These accelerators are quite different from those used with conventional concrete and have traditionally included such materials as alkali metal hydroxides, aluminates and silicates.

The highly alkaline nature of these materials has given handing problems. It also means that their use in confined spaces such as tunnels has led to very unpleasant working atmospheres. Recent attempts to avoid such materials have involved the use of aluminium compounds and typical examples may be found in European Patents 0 076 927, 0 775 097 and 0 742 179, Australian Patent 706917 and European Applications 0 812 812 and 0 946 451.

It has now been found that it is possible to prepare an accelerator for sprayed concrete by a simple process, which accelerator performs especially well. The invention therefore provides a method of preparing an accelerator for sprayed cementitious material consisting essentially of the steps of (i) dissolving aluminium sulphate and aluminium hydroxide in water, which optionally contains at least one amine dissolved therein, to give a clear solution; and (ii) optionally adding at least one defoaming agent;

the proportions of ingredients present being such that the final product contains from 3%-12% by weight of aluminium sulphate (measured as $Al_2O_3$), up to 30% by weight of amorphous aluminium hydroxide, up to 15% by weight amine, up to 3% by weight defoaming agent and up to 1.5 mol./kg. stabiliser, the stabiliser being glycolic acid.

The invention additionally provides an accelerator for use with sprayed cementitious material preparable by such a method.

The invention additionally provides an accelerator for cementitious material consisting essentially of a solution of aluminium sulphate, amorphous aluminium hydroxide and glycolic acid, optionally containing amine and defoaming agent, the accelerator containing from 3%-12% by weight of aluminium sulphate (measured as $Al_2O_3$), up to 30% by weight of amorphous aluminium hydroxide, up to 15% by weight amine, up to 3% by weight defoaming agent and up to 1.5 mol/kg. glycolic acid.

The aluminium sulphate used may be any commercially-available material. Aluminium sulphates differ in their purity and constitution, the most common being so-called "17%" because it contains 17% of $Al_2O_3$. In practical terms, the weight percentage of 17% aluminium sulphate, $Al_2(SO_4)_3 \cdot 14.3H_2O$, which should be used in the process according to the invention lies in the range of from 30% to 60%, preferably from 40%-54%.

The aluminium hydroxide may be any commercially-available amorphous aluminium hydroxide. Although all such aluminium hydroxides will give satisfactory results, it is generally true that the more recent the date of manufacture, the better the result. In addition, aluminium hydroxides which, as a result of their particular manner of manufacture, contain a small proportion of aluminium carbonate (up to 5%) are easier to dissolve and are preferred materials. This behaviour is not obtained by simply adding aluminium carbonate to pure aluminium hydroxide. Although very small quantities of aluminium hydroxide may be used (less than 0.1% is possible), a significant improvement is observed at 5% or more. The preferred range of weight proportions is from 4-25%, preferably from 6-18%.

There must also be present a stabiliser, which may be added at the end of the process. This is a material which prevents the aluminium hydroxide/aluminium sulphate solution either from precipitating or from forming a gel. Without stabiliser, the solution will function well as an accelerator, but it will lack stability and therefore shelf life, necessitating its use very shortly after manufacture, something usually not practical.

The stabiliser for use in this invention is glycolic acid (hydroxyacetic acid). It has been previously proposed to use hydroxycarboxylic acids as stabilisers in International Application PCT/EP00/12216, but there was no specific mention of glycolic acid and the preferred acid in that application was citric acid. It has been found surprisingly that glycolic acid gives outstanding stability, far better than other hydroxycarboxylic acids. Preferably the stabiliser is present to the extent of from 0.1-1 mol./kg. As a general rule, the more glycolic acid present, the better the stability. However, there comes a point when addition of further glycolic acid brings no improvement. Thus, although the stated maximum of 1.5 mol./kg. can be exceeded, this brings no benefit. The best results are obtained by using quantities in the region of 1 mol./kg.

The properties of the accelerators provided by this invention can be considerably enhanced by the use of one or both of two optional, but preferred, components.

The first of these is amine. This must be water-soluble, otherwise there is no restriction on the choice of amine. Preferred amines are alkanolamines, such as diglycolamine, diethanolamine and triethanolamine, diethanolamine being particularly preferred. Up to 12% by weight amine may be used, but the preferred quantity is from 1-4%.

The second preferred additional component, defoaming agent, may be any such material known to the art. Most of these are proprietary commercial materials whose precise composition is never revealed, but any such material known to the art is suitable. Typical examples include silicone types such as AGITAN (trade mark) and fatty acid polyether types such as LUMITEN (trade mark) EL.

The defoaming agent may be used at a rate out up to 5% (solids by weight of the whole composition), preferably from 0.5%-3%. The use of defoaming agent makes the use of less fresh aluminium hydroxides easier. It is believed, without restricting the scope of the invention in any way, that its presence helps in the removal of carbon dioxide which accumulates on the surface of the aluminium hydroxide over time. Surprisingly, provided that the defoamer contains no silicone and that it is not present to the extent of more than 3%, it gives an appreciable improvement in setting time over that of an identical composition without defoaming agent or with silicone types.

The process of the invention is readily carried out with standard equipment, and the skilled person will have no difficulty in doing so. It will be appreciated that in order to achieve solutions at the various stages, some heating may be necessary, typically to about 50-60° C.

In the process, the clear solution can be produced by any convenient method. It is possible to add the aluminium sulphate and aluminium hydroxide sequentially in any order to water. It is also possible to add them together to water, or to dissolve or disperse them individually in two different quantities of water and then combine these quantities.

Preferably, the aluminium sulphate and the aluminium hydroxide are added sequentially to water. Preferably the aluminium sulphate is first dissolved in water; aluminium sulphate will dissolve with heating. To this solution the aluminium hydroxide is then added. A clear solution is obtained.

It is possible, although less preferable, first to add the aluminium hydroxide to the water. Aluminium hydroxide does not dissolve readily in water, but gives a fine suspension. To this suspension the aluminium sulphate is added. A clear solution is obtained. The stabiliser is added to this solution and stirred in.

The precise nature of the product of the process is not known. It is certainly not a mere mixture of the original components (the fact that the product is a clear or slightly turbid solution and not an opaque suspension typical of aluminium hydroxide is evidence of this), and without restricting the invention in any way, it is believed to be oligomeric or polymeric in nature.

The accelerator thus prepared gives excellent results when used as an accelerator for sprayed cementitious material, especially concrete. Sprayed concrete treated with this accelerator hardens rapidly and has good final strength. The accelerator has a long shelf-life, is resistant to changes in temperature and is completely non-alkaline, thus leading to better working environments.

The invention therefore also provides a method of applying a cementitious composition to a substrate by spraying, comprising the conveying of the composition to a spray nozzle, there being added at the nozzle an accelerating composition of the kind hereinabove described.

The invention is further illustrated by the following non-limiting examples.

An accelerator is made from the following ingredients:

| | |
|---|---|
| aluminium sulphate (17%) | 42 parts (weight) |
| aluminium hydroxide | 18 parts (weight) |
| glycolic acid | 4 parts (weight) |
| diethanolamine | 1 parts (weight) |
| water | 35 parts (weight) |

The water is heated to 55°-60° C., and the aluminium sulphate is added with stirring. When it has dissolved, the aluminium hydroxide is added, followed by the glycolic acids and the amine. The mixture is then allowed to cool. The final solution is a pale yellow, slightly turbid solution.

This accelerator composition is called Accelerator A.

Another accelerator (Accelerator B) is prepared in the same manner, but substituting formic acid, a well-known stabiliser, for glycolic acid. The quantity of water is reduced, so that more formic acid can be added—the quantity of formic acid in Accelerator B is twice that of glycolic acid in Accelerator A.

Both accelerators are subjected to long-term stability testing at 5° C., 20° C. and 40° C. The particular test period is 70 days. The assessment criteria and the results are as follows:
a) Change in turbidity Both accelerators show no change over the entire period at 5° and 20°. However, at 40°, Accelerator A shows a turbidity change (indicating the onset of instability) at 31 days, whereas Accelerator B showed this change at 13 days.

(b) Gelling A gelled accelerator cannot be used. Both accelerators show no gelling over the whole period at 5° and 20°, but Accelerator A gelled at 59 days and Accelerator B at 27 days.
(c) Separation The separation of the accelerator solution into discrete liquid layers indicates that it can no longer be used. Both accelerators show no separation over the period.
(d) Sedimentation Excessive sedimentation (in excess of 1 mm) means that an accelerator can no longer be used. Neither accelerator has excessive sedimentation over the period of the test.

The performance of Accelerator B is typical of a high-performance commercial accelerator. It can readily be seen that Accelerator A according to the invention has a significant edge in stability performance, even though it has only half of the quantity of stabiliser. 40° C. is typical of the temperatures commonly encountered in tunnels, and it is often required that accelerators ready for use be stored in such conditions. The improvement in performance shown by Accelerator B is therefore of major commercial significance, as it saves the need for less stable accelerators to be stored in cooler conditions and then brought in on demand.

The invention claimed is:

1. A method of preparing an accelerator for sprayed cementitious compositions, consisting essentially of the steps of
   (i) dissolving aluminium sulphate and aluminium hydroxide in water, which contains at least one amine dissolved therein, to give a clear solution;
   (ii) adding a stabiliser; and
   (iii) optionally adding at least one defoaming agent;
the proportions of ingredients present being such that the final product contains from about 3% to about 12% by weight of aluminium sulphate (measured as $Al_2O_3$), from greater than 0% up to about 30% by weight of amorphous aluminium hydroxide, from greater than 0% up to about 15% by weight amine, from 0% up to about 3% solids by weight of the whole composition defoaming agent and from 0.1 mol/kg up to about 1.5 mol/kg stabiliser comprising glycolic acid.

2. A method according to claim 1, wherein there is added at least one defoaming agent.

3. A method according to claim 2, wherein the defoaming agent contains no silicone and is present to a maximum extent of about 3% solids by weight of the whole composition.

4. A method according to claim 1, wherein the clear solution is prepared by the steps of
   (i) dissolving aluminium sulphate in water, containing at least one amine dissolved therein;
   (ii) dissolving amorphous aluminium hydroxide in the solution of (i) until a clear solution is obtained; and
   (iii) adding glycolic acid to the clear solution.

5. A method according to claim 4, wherein there is added to the clear solution at least one defoaming agent.

6. A method of applying a cementitious composition to a substrate by spraying, comprising conveying the composition to a spray nozzle, there being added at the nozzle the accelerator prepared by the method of claim 5.

7. A method of applying a cementitious composition to a substrate by spraying, comprising conveying the composition to a spray nozzle, there being added at the nozzle an accelerator consisting essentially of an aqueous solution of aluminium sulphate, amorphous aluminium hydroxide and glycolic acid, containing amine and optionally defoaming agent, the accelerator containing from about 3% to about 12% by weight of aluminium sulphate (measured as $Al_2O_3$), from greater than 0% up to about 30% by weight of amorphous aluminium hydroxide, from greater than 0% up to about 15% by weight amine, from 0% up to about 3% solids by weight of the whole composition defoaming agent and from 0.1 mol/kg up to about 1.5 mol/kg glycolic acid.

8. A method of applying a cementitious composition to a substrate by spraying, comprising conveying the composition to a spray nozzle, there being added at the nozzle the accelerator prepared by the method of claim 1.

9. An accelerator for use with sprayed cementitious compositions, consisting essentially of an aqueous solution of aluminium sulphate, amorphous aluminium hydroxide and glycolic acid, containing amine and optionally defoaming agent, the accelerator containing from about 3% to about 12% by weight of aluminium sulphate (measured as $Al_2O_3$), from greater than 0% up to about 30% by weight of amorphous aluminium hydroxide, from greater than 0% up to about 15% by weight amine, from 0% up to about 3% solids by weight of the whole composition defoaming agent and from 0.1 mol/kg up to about 1.5 mol/kg glycolic acid.

10. An accelerator for use with sprayed cementitious compositions, produced by a process that consists essentially of the steps of
 (i) dissolving aluminium sulphate and aluminium hydroxide in water, which contains at least one amine dissolved therein, to give a clear solution;
 (ii) adding a stabiliser; and
 (iii) optionally adding at least one defoaming agent;
the proportions of ingredients present being such that the final product contains from about 3% to about 12% by weight of aluminium sulphate (measured as $Al_2O_3$), from greater than 0% up to about 30% by weight of amorphous aluminium hydroxide, from greater than 0% up to about 15% by weight amine, from 0% up to about 3% solids by weight of the whole composition defoaming agent and from 0.1 mol/kg up to about 1.5 mol/kg stabiliser comprising glycolic acid.

* * * * *